C. F. HARTUNG.
STORAGE BATTERY CLIP.
APPLICATION FILED FEB. 4, 1919.

1,366,799.

Patented Jan. 25, 1921.

Inventor
Charles F. Hartung
by Graham & Harris
Attorneys

UNITED STATES PATENT OFFICE.

CHARLES F. HARTUNG, OF ALHAMBRA, CALIFORNIA.

STORAGE-BATTERY CLIP.

1,366,799.

Specification of Letters Patent.  Patented Jan. 25, 1921.

Application filed February 4, 1919. Serial No. 275,023.

*To all whom it may concern:*

Be it known that I, CHARLES F. HARTUNG, a citizen of the United States, residing at Alhambra, in the county of Los Angeles and State of California, have invented a new and useful Storage-Battery Clip, of which the following is a specification.

My invention relates to the care and maintenance of storage batteries.

The principal object of the invention is to provide a clip by which an electrical connection can be solidly and readily made to the terminal of a storage battery for charging or testing purposes. Various types of spring clips have been developed for this purpose but the clip to be hereinafter described has certain advantages over previous clips which will be set forth more in detail hereinafter.

Referring to the drawings, which are for illustrative purposes only,

Figure 1:
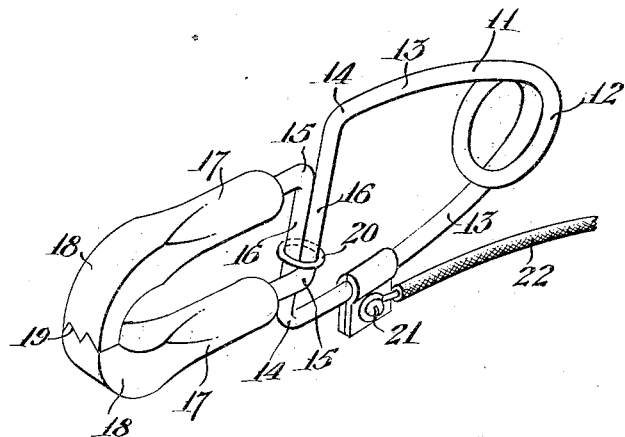
Figure 1 is a perspective view of a clip embodying my invention.
Figure 2:
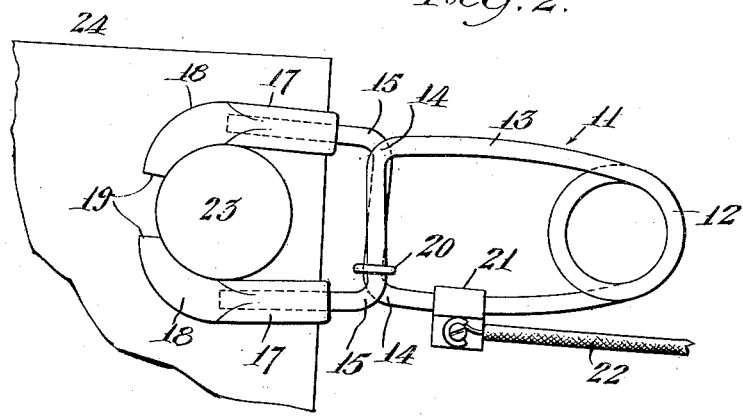
Fig. 2 is a plan view of the same clip in place on a storage battery lug.

As illustrated, the clip consists of a piece of spring wire 11 which is bent to form a spring convolution 12 which terminates in two arms 13. Each of the arms 13 has a primary bend as shown at 14 and a secondary bend as shown at 15, the guide portions 16 between the bends 14 and 15 being approximately parallel and in close contact with each other under normal conditions.

Formed on the ends of the wire are jaws 17, these jaws being formed of lead, preferably cast in place and curved as shown at 18, and provided with serrations 19. Secured around the members 16 is a ring 20 which is used for the purpose of holding the arms 16 together to prevent their springing apart in a direction at right angles to the portions 16. Secured on one of the members 13 is a connector 21 to which a flexible wire 22 is secured.

The wire 11 and the ring 20 may be of some acid resisting metal or they may be of steel thoroughly coated with lead after it has been bent into the form shown, the object of the lead jaws 17 and the lead coating on the wire 11 being to resist the corrosive action of the acids generally found around storage batteries, especially in places where they are charged and repaired.

In practice the wire 20 is so bent that the parts naturally tend to assume the position shown in Fig. 1 with the jaws 17 pressed tightly together. If it is desired to secure them about something such as the lug 23 of the storage battery 24 the jaws 17 are sprung apart by pressing inwardly on the limbs 13 so that the jaws can be sprung over the lug 23 for example. Upon releasing the limbs 13 the jaws 17 are sprung inwardly by the spring convolution 12 thus forming a good electrical contact with the lug 23.

What I claim is:—

1. A spring clip for storage batteries comprising a wire member bent to form a spring convolution terminating in two arms, each of said arms terminating in a primary bend which joins said arm with a guide portion, said guide portions being approximately parallel and adjacent to each other, said wire member also having a secondary bend at the outer end of said guide portion, said bends each directing the outer ends of said wire in a direction approximately parallel to said arm, two lead jaws each secured to one of said outer ends, and means for preventing said guide portions from separating.

2. A spring clip for storage batteries comprising a wire member bent to form a spring convolution terminating in two arms, each of said arms terminating in a primary bend which joins said arm with a guide portion, said guide portions being approximately parallel and adjacent to each other, said wire member also having a secondary bend at the outer end of said guide portion, said bends each directing the outer ends of said wire in a direction approximately parallel to said arm, two lead jaws each secured to one of said outer ends, and a loose ring encircling both of said guide portions for the purpose of preventing said guide portions from separating.

In testimony whereof I have hereunto set my hand at Los Angeles, California, this 28th day of January, 1919.

CHARLES F. HARTUNG.